UNITED STATES PATENT OFFICE.

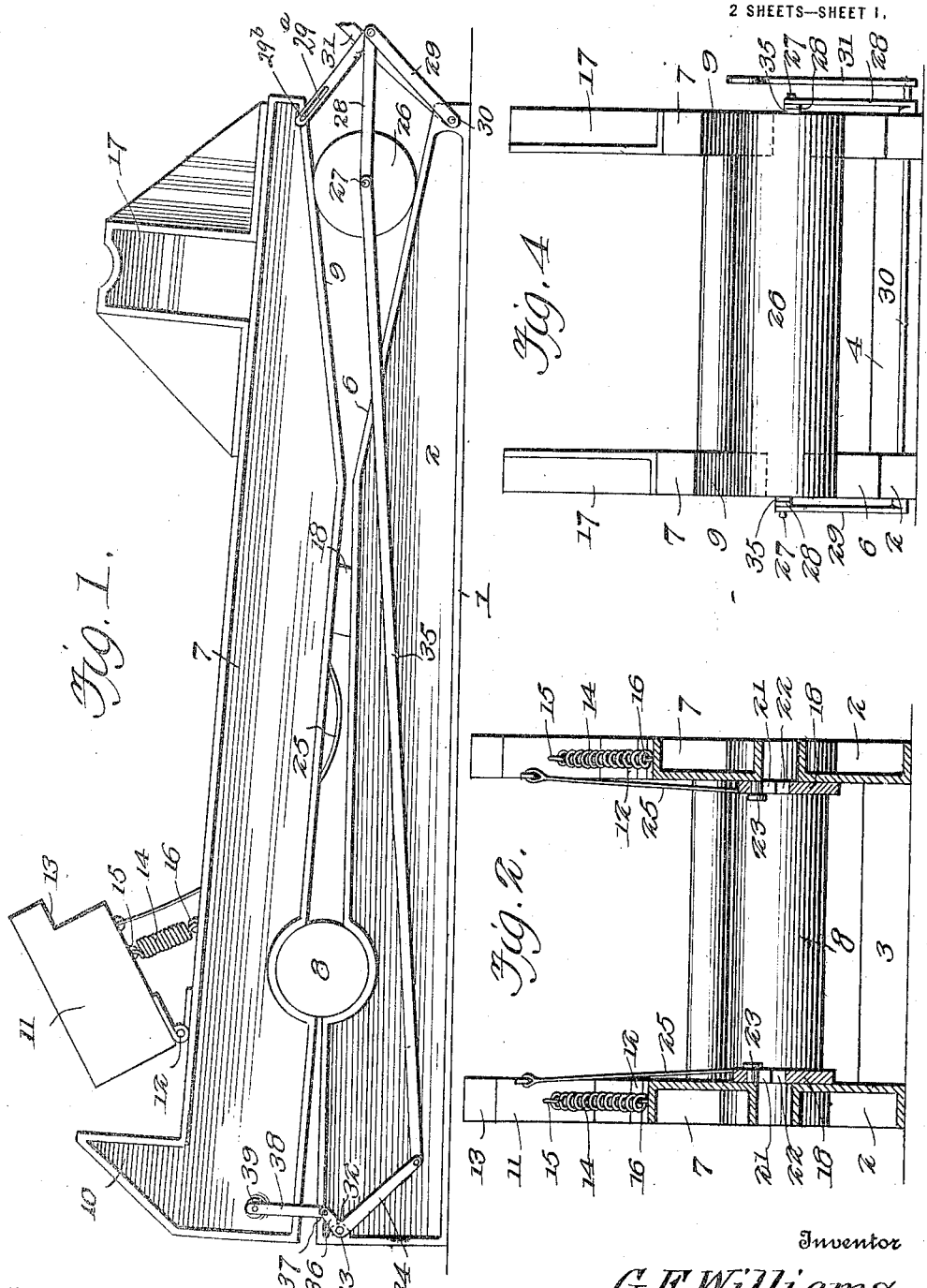

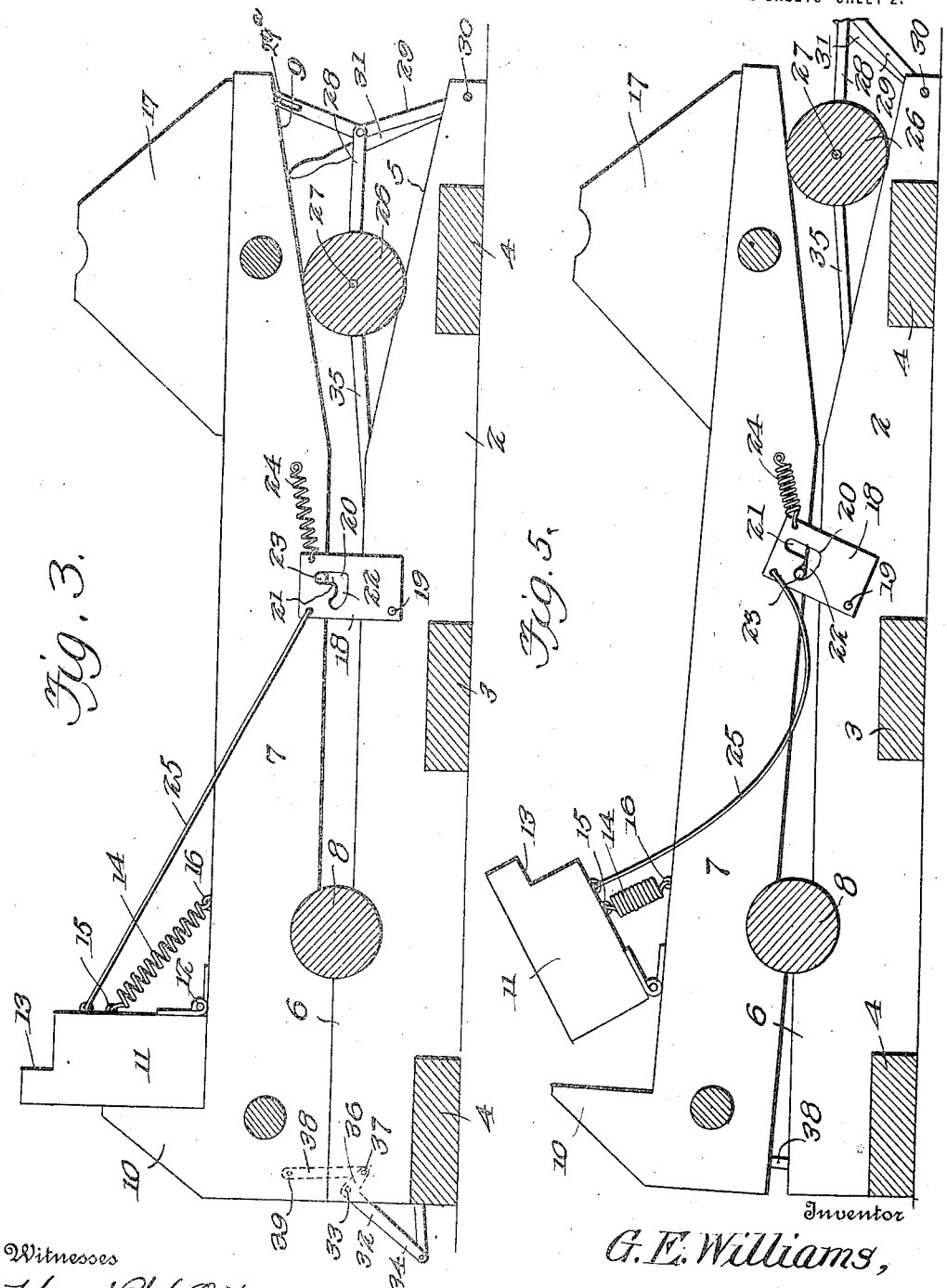

GRIFFITH E. WILLIAMS, OF CAMBRIA, WISCONSIN.

AUTOMOBILE-JACK.

1,210,243.　　　Specification of Letters Patent.　　Patented Dec. 26, 1916.

Application filed May 20, 1916. Serial No. 98,888.

*To all whom it may concern:*

Be it known that I, GRIFFITH E. WILLIAMS, a citizen of the United States, residing at Cambria, in the county of Columbia and State of Wisconsin, have invented new and useful Improvements in Automobile-Jacks, of which the following is a specification.

This invention is an improved automatic automobile jack for raising an automobile so that its wheels are clear of the ground, the object of the invention being to provide an improved machine of this character which is simple in construction, operates automatically, and which is not likely to get out of order.

The invention consists in the features of construction, combination, and arrangement of devices, hereinafter fully described and claimed.

In the accompanying drawings: Figure 1 is a side elevation of an automobile jack constructed and arranged in accordance with my invention and showing the same in initial position. Fig. 2 is a transverse sectional view of the same. Fig. 3 is a longitudinal sectional view of the same with the jack in lifting position. Fig. 4 is a front end elevation of the jack. Fig. 5 is a longitudinal sectional view of the same in initial position.

In the embodiment of my invention I provide a base frame 1 which comprises a pair of side members 2, a centrally arranged cross member 3 and a pair of end cross bars 4. Each side member is provided with an inclined upper surface or plane 5 which extends from its front end, and has a vertically extended or raised rear end portion 6.

Rocker bars 7 are pivotally mounted on the side members 2 of the base frame by means of a roller or shaft 8. Each rocker bar is provided at its front end on its under side with an inclined surface or plane 9 which is above and reverse to the inclined plane 5 of the corresponding side member 2, said inclined planes converging toward the rear end of the jack as shown. Each rocker member 7 is provided on its upper side at its rear end with a stop brace 10 and is also provided with a lifting block 11 which is hinged or pivotally mounted as at 12 and hence is adapted to be folded forwardly and turned down over the rocker and is also adapted to be turned rearwardly and to assume a vertical position on the rocker and bear against the stop 10. Each lifting block has a stop shoulder 13 at its rear upper corner. A spring 14 is connected to each block as at 15 and is also connected to one of the rocker members as at 16, said springs serving to normally turn the rocker blocks forwardly to initial lowered position. On the front end of each rocker member is a pillar block 17 which is adapted to bear under and raise the rear axle of an automobile, the rear lifting blocks 11 being adapted to bear under and raise the front axle when the automobile is moved over the jack.

On the inner side of each side member 2 is a locking plate 18 which is pivotally mounted as at 19, and is provided with a slot 20 which has a vertical arm 21 and a horizontal arm 22 communicating with the lower end of the vertical arm and extending toward the pivot. The locking plates bear slidably against the inner sides of the rocker members 7 and each rocker member is provided with a locking pin or stud 23 to operate in the slot of the locking plate. A spring 24 is connected to each lock plate to draw it forwardly and each lock plate is connected to one of the lifting blocks by a rod or wire 25.

Normally, when the front ends of the rocker members 7 are lowered, the lifting blocks 11 are turned forward and lowered, the locking plates are turned forwardly by the springs 24, and the locking studs 23 are engaged in the lower, shorter arms 22 of the angled slots 20. When an automobile is moved over the jack, from the front end of the latter and its front axle strikes the shoulder 13, of the locking blocks 11, said locking blocks are turned to vertical position on the rockers by the inertia of the automobile and in so doing, cause the locking plates to turn rearwardly, thus disengaging the stud 23 from the arms 22 of the slots and the said studs are then free to move upwardly in the arms 21 of the slots, the rocker members 7 turning on the pivot 8 and assuming a horizontal position, thus causing pillar blocks 17 to bear under and raise the rear axle of the automobile, the front axle thereof being raised by the lifting blocks 11 as will be understood.

To hold the parts of the machine in lifting position, I provide a chock roller 26 which is adapted to roll on the inclined planes 5 and between them and the inclined planes 9. The axle 27 of the chock roller is connected by links 28 to rock arms 29 of a rock shaft 30, said rock shaft having its bearings in the front ends of the members 2 and being provided at one end with a handle or lever 31. On the outer side of each side member 2 of the base frame is a bell crank lever 32, the pivot of which is indicated at 33. The arm 34 of each bell crank lever is connected by a rod 35 to one end of the chock roller axle and the arm 36 of each bell crank lever is pivotally connected as at 37 to a link 38, which link is pivotally connected as at 39 to the outer side of one of the rocker members 7. It will be understood that as the rocker members turn on their pivot 8 to horizontal position, and when raising the automobile, the links 38 exert downward thrust on the arms 36 of the bell crank levers, thus causing the bell crank levers to turn on their pivot 33, and also causing the arms 34 of the bell crank levers which turn rearwardly to cause the links 35 to draw the chock roller rearwardly between the opposing inclined planes 5 and 9 and thus effectually chock the jack and hold the same with parts in lifting position. The rock shaft may be reversely turned manually by its handle or lever 31, which if desired, may be operated from the automobile, to cause the rocker arm 29 and links 28 to draw the chock roller forwardly, thus releasing the rocker members 7, whereupon the weight of the automobile on the pillar block 17, by reason of the location of the pivot 8, near the rear end of the jack, will cause the front ends of the rockers to be lowered, so that the rear automobile wheels are lowered to the ground or floor and the automobile can then be readily backed off the jack, as will be readily understood, the springs 14 restoring the lifting blocks and said lifting blocks and rods 25 restoring the locking plates 18 to initial position.

Having described the invention, what is claimed is:

1. In an automobile jack, a base, a rocker member pivotally mounted thereon, the pivotal connection between the rocker member and the base being near the rear end of the jack, a pivotally mounted lifting block on the rear portion of the rocker, and a pillar block on the front portion of the rocker.

2. In an automobile jack, a base, a rocker member pivotally mounted thereon, the pivotal connection between the rocker member and the base being near the rear end of the jack, a pivotally mounted lifting block on the rear portion of the rocker, a pillar block on the front portion of the rocker, means to normally turn the lifting block forwardly to initial lowered position, and locking means including a movable element connected to and operated by the lifting block.

3. In an automobile jack, a base having an inclined plane, a rocker element pivotally mounted on the base, the pivot of the rocker element being near the rear end of the jack, a lifting block pivotally mounted on the rear portion of the rocker, a pillar block on the front portion of the rocker, a chock roll arranged to operate on the inclined plane, and means actuated by the rocker element to cause said chock roll to be moved upwardly on the inclined plane and chock the rocker element, when the latter is arranged with its front end in raised position.

4. In an automobile jack, a base having an inclined plane, a rocker element pivotally mounted on the base, the pivot of the rocker element being near the rear end of the jack, a lifting block pivotally mounted on the rear portion of the rocker, a pillar block on the front portion of the rocker, a chock roll arranged to operate on the inclined plane, and means actuated by the rocker element to cause said chock roll to be moved upwardly on the inclined plane and chock the rocker element, when the latter is arranged with its front end in raised position, said means comprising a bell crank mounted on the base, a connection between the bell crank and the rocker, and a connection between the bell crank and the chock roll.

5. In an automobile jack, a base having an inclined plane, a rocker element pivotally mounted on the base, the pivot of the rocker element being near the rear end of the jack, a lifting block pivotally mounted on the rear portion of the rocker, a pillar block on the front portion of the rocker, a chock roll arranged to operate on the inclined plane, and means actuated by the rocker element to cause said chock roll to be moved upwardly on the inclined plane and chock the rocker element, when the latter is arranged with its front end in raised position, said means comprising a bell crank mounted on the base, a connection between the bell crank and the rocker, a connection between the bell crank and the chock roll, and a rock shaft at the front end of the base having a rock arm connected to the chock roll to move the latter to release position, said rock shaft having also an operating lever.

In testimony whereof I affix my signature.
GRIFFITH E. WILLIAMS.

In presence of—
Ira W. Parker,
T. W. Miller.